United States Patent [19]

Stravitz

[11] 4,383,735
[45] May 17, 1983

[54] PHOTOGRAPHIC FILTER PACK AND FILTER HOLDER

[75] Inventor: David M. Stravitz, New York, N.Y.

[73] Assignee: Ambico Inc., Lynbrook, N.Y.

[21] Appl. No.: 184,386

[22] Filed: Sep. 5, 1980

[51] Int. Cl.³ .......................... G02B 7/00; G02B 11/00
[52] U.S. Cl. ..................................... 350/318; 354/295
[58] Field of Search ................. 350/318; 354/295, 296

[56] References Cited

U.S. PATENT DOCUMENTS 1,556,648 10/1925 Symms ................................ 350/318
4,302,078 11/1981 Stravitz .............................. 350/318

Primary Examiner—Bruce Y. Arnold
Attorney, Agent, or Firm—Frishauf, Holtz, Goodman & Woodward

[57] ABSTRACT

A combination photographic filter pack and filter holder attaches to the front of a camera lens and comprises first and second housings, the first housing being connected to the second housing, preferably in a slideable and nesting manner. The first housing defines a storage area for retaining a plurality of photographic filters, and the second housing comprises an arrangement for removable attachment to the front of a camera lens, and a space for slideably receiving filters from the storage area of the first housing and for retaining the received filters in an operative position in registration with a camera lens. Any or all of the filters from the storage area in the first housing can be slid to the operative position within the second housing as desired. The housings also are disengageable for replacement of the filters contained therein. Also disclosed are various filter frames for use with the combination filter pack and filter holder.

30 Claims, 21 Drawing Figures

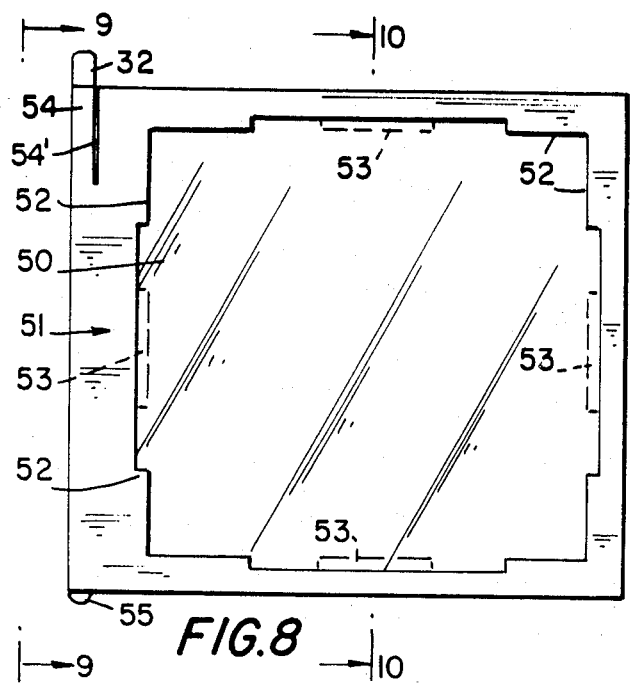
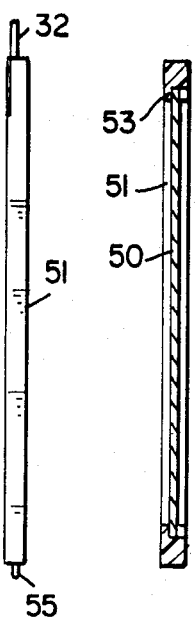
FIG.8　FIG.9　FIG.10
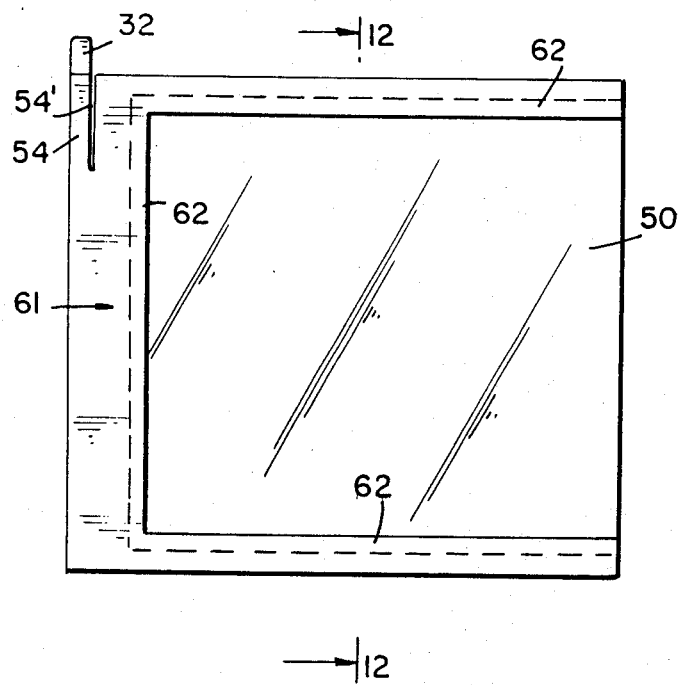
FIG.11　FIG.12

PHOTOGRAPHIC FILTER PACK AND FILTER HOLDER

CROSS REFERENCE TO RELATED APPLICATION

U.S. application Ser. No. 86,055, now U.S. Pat. No. 4,302,078, filed Oct. 18, 1979, in the name of David M. Stravitz, the entire contents of which are incorporated herein by reference.

BACKGROUND OF THE INVENTION

This application relates to a combination photographic filter pack and filter holder, and more particularly to such a combination having a removable adapter for threadably engaging a threaded front end of a camera lens to mount the combination pack and holder to a camera.

Conventional filter holders to mount a plurality of filters to the front of a lens of a camera require the filters to be pre-loaded into a filter holder, which is mounted to the front of the lens. In order to change filters, it is necessary to remove the filters from the filter holder, and to then insert different filters in the filter holder. This requires additional handling of the filters, which could cause them to become scratched, soiled or otherwise have their optical characteristics impaired. Also, it is necessary to provide a separate storage arrangement to store the filters which are not mounted in the filter holder, to prevent them from being damaged.

The object of the present invention is to provide an improved combination filter pack and filter holder for holding and storing a plurality of filters in a protected condition, the filters being easily moved from a protected storage location to an operative location, without requiring handling of the filters, per se. Another object is to provide such a combination in a single package which may be readily handled, readily installed on a camera, which is compact to use and store, and which provides protection for the filters when they are in their operative position on a camera, as well as when in their storage position.

A further object of the invention is to provide such a combination filter pack and filter holder which may be pre-loaded with a plurality of filters prior to use, the filters then being selectively movable from a storage to an operative position, in any combination, and in a simple and expedient manner.

Yet another object of the invention is to provide such a combination filter pack and filter holder which is adaptable to substantially any size lens with minimum expense and difficulty.

SUMMARY OF THE INVENTION

According to the present invention a combination photographic filter pack and filter holder for attachment to the front of a camera lens, comprises first and second housing members which are connected together, the first housing member defining a storage area and including means for storing and retaining a plurality of photographic filters in the storage area, and the second housing member comprising means for removable attachment to the front of a camera lens. The second housing member also includes means for slidably receiving filters from the storage area of the first housing member and for retaining received filters in an operative position in registration with a camera lens to which the second housing member is attached. The first housing member also includes means for selectively and slidably feeding any or all of the filters from the storage area within the first housing member to the operative position within the second housing member.

Preferably, the first and second housing members are slidable relative to each other, one of the housing members being slidable within the other housing member from a nested position wherein said one housing member is nested within said other housing member, to an operative position wherein the first and second housing members are located adjacent each other. The second housing member is preferably slidable within the first housing member.

A removable adapter is mounted to the second housing member for mounting to any type of camera lens thread, the adapter being preferably rotatable relative to the second housing member.

BRIEF DESCRIPTION OF THE DRAWINGS

FIG. 8 is a front view of a filter mounted in a frame for use in the present invention;

FIG. 9 is a view taken in the direction of the arrows 9—9 in FIG. 8;

FIG. 10 is a sectional view taken along line 10—10 in FIG. 8;

FIG. 11 is a front view of a modified filter according to the present invention;

FIG. 12 is a sectional view taken along the line 12—12 in FIG. 11;

DETAILED DESCRIPTION

Figure 1:
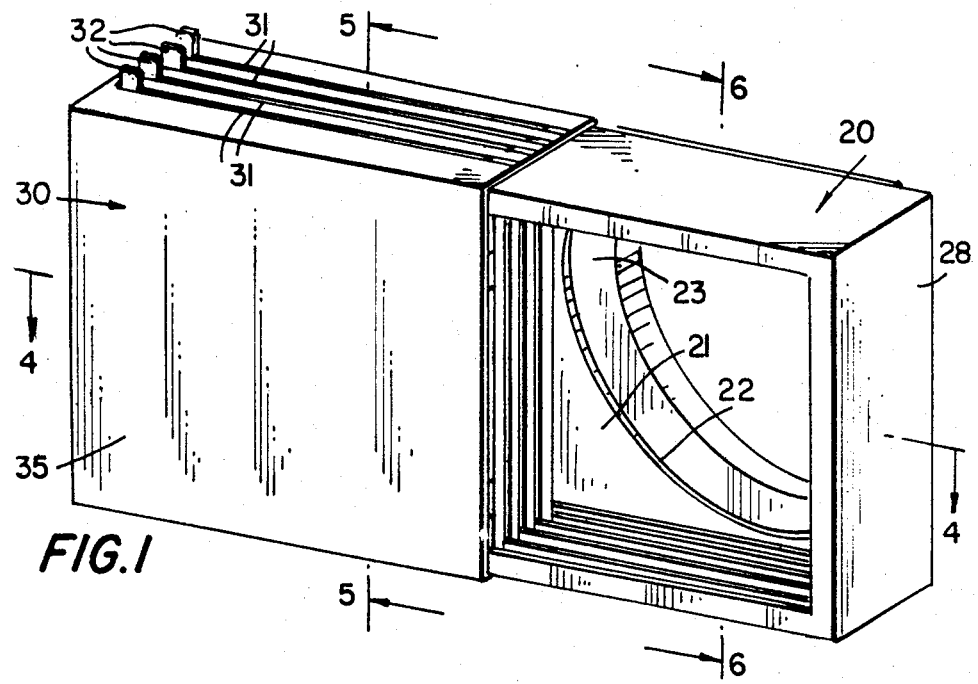
FIG. 1 is a perspective view of a combination filter pack and filter holder according to the present invention, the device being shown in its opened or operative state.

Referring to FIGS. 1-4, a combination filter pack and filter holder of the present invention comprises an inner housing member 20 which is slidable within an outer housing member 30. The inner member 20 has a rear wall 21 with a generally circular opening 22 therein. A threaded adapter 23, of the same type as used in co-pending Application U.S. Ser. No. 86,055, now U.S. Pat. No. 4,302,078, is slidably and removably mounted to the inner member 20 via slots or channels 24 and is locked in position by means of a protrusion 25 extending outwardly from rear wall 21 of the inner member 20. The rear wall 21 is of resilient material so that the protrusion 25 may be depressed below the adapter 23 to permit the adapter 23 to be slid out of the slots or channels 24 and removed from the inner member. The adapter 23 is rotatable relative to the inner member 20 to permit the device to be rotated relative to a camera on which it is mounted.

Figure 6:
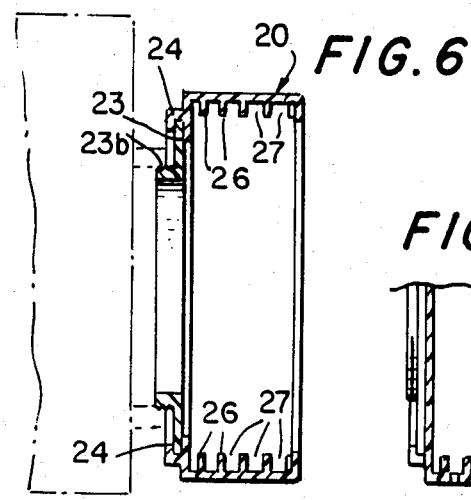
FIG. 6 is a sectional view taken along the line 6—6 in FIG. 1, further partially showing a camera and lens in dashed lines.

As best seen in FIGS. 1 and 6, the inner member 20 has thin ribs extending inwardly from the top and bottom surfaces thereof, the ribs 26 being spaced apart to define respective channels 27 which slidable receive filters therein. The channels 27 in the upper and lower surfaces of the inner member 20 are in registration with each other. Channels may or may not be provided on the remote wall 28 of the inner member.

The outer member 30 retains and stores a plurality of filters which are slidably mounted therein, four filters being shown in the illustrated embodiment. It should be clear that a larger or smaller number may be provided, depending upon the thickness or width of the device. Also, while the device illustrated in the drawings may accomodate up to four filters, fewer than four filters could be used in the illustrated device.

Figure 2:
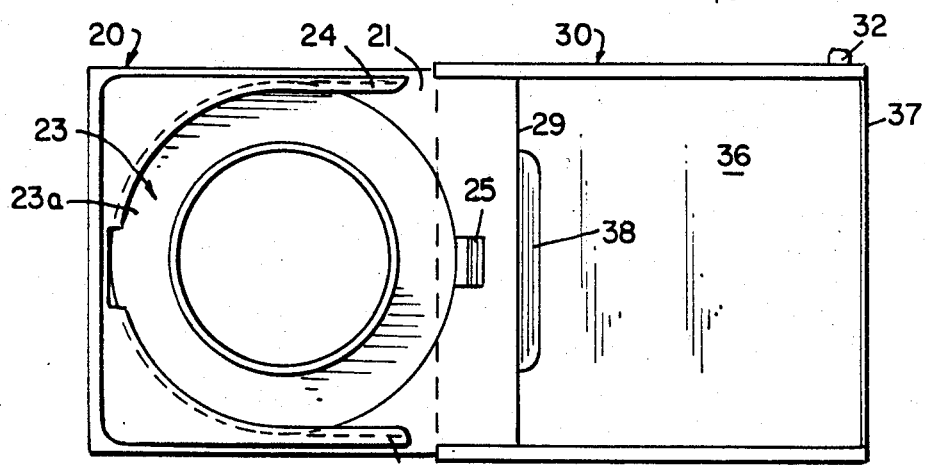
FIG. 2 is a rear view of the device in the open state as shown in FIG. 1.
Figure 4:
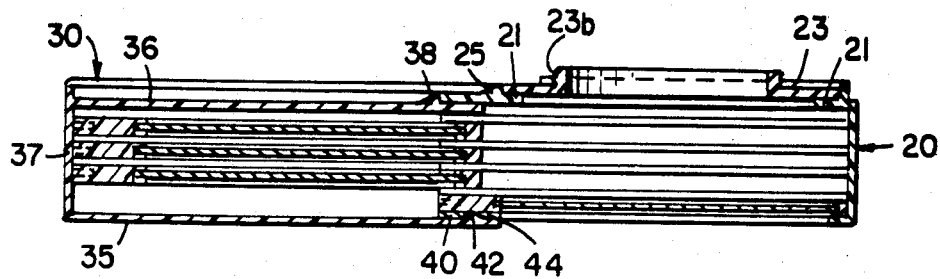
FIG. 4 is a sectional view taken along the line 4—4 in FIG. 1.
Figure 5:
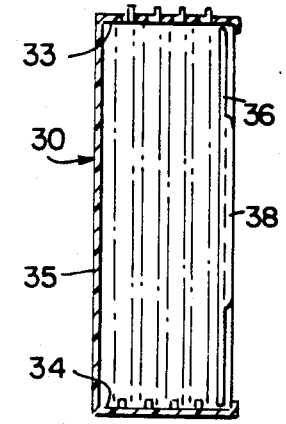
FIG. 5 is a sectional view taken along the line 5—5 in FIG. 1.
Figure 16:
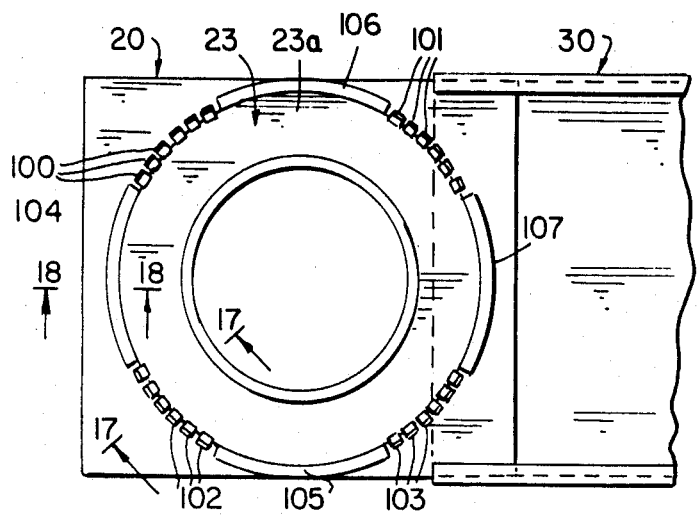
FIG. 16 is a rear view of another embodiment of the invention showing another retainer arrangement for the adapter.

The outer member 30 has four elongated through slots 31 in the upper surface thereof for slidably receiving tabs 32 of respective filters or filter frames (to be described later). The upper and lower surfaces 33, 34 (FIG. 5) are not provided with ribs to define channels, such as shown in FIG. 6. It has been found that such ribs and channels are not necessary in outer member 30. However, such ribs and/or channels could be provided, as desired. The front surface 35 of the outer member 30 is a solid sheet-like member, as is the rear surface 36. The rear surface 36 is attached to the outer housing at the end surface 37, as seen in FIGS. 2 and 4. As shown in FIG. 5, the rear surface 36 is not secured to the outer housing at the upper and lower ends thereof. However, as a modification, the upper and lower ends of the rear surface 36 may be attached to upper and lower ends 33,34, for example, of outer member 30. The rear surface 36 has a protrusion 38 thereon which snaps over the end 29 of the rear surface 21 of the inner member 20. The rear surface 36 is biased outwardly (due to the resiliency of the material from which it is made) so that protrusion 38 may snap outwardly against the rear edge 29 of surface 21 to lock the device in the open position, as shown, for example, in FIGS. 2 and 4. In order to close the device, it is only necessary for the user to press inwardly with his finger on rear surface 36 in the vicinity of protrusion 38 to release it from edge 29 of surface 21. Then, the inner member 20 may be slid relative to the outer member 30 so as to be nested therein with the protrusion 38 being slid along the inner face of rear surface 21, as shown in FIG. 16.

In use, the threaded portion of the adapter 23 is threadably mounted to the front of the lens of a camera, and is mounted to the combination filter pack and filter holder by sliding the flange 23a of the adapter 23 into the slots or channels 24 and is locked in place by protrusion 25. The adapter 23 may be mounted to the filter pack and holder before or after threadably engaging the threads of a lens. The device is opened by sliding the outer member 30 relative to the inner member 20 until it reaches the open position shown in FIGS. 1-3, at which point protrusion 38 snaps behind edge 29 to lock the device in the open position. Tabs 32 of the filters are then selectively slid within slots 31 to slide a filter from its storage position within outer member 30 to its operative position in inner member 20 in registration with the opening 22 so as to be in front of the lens of the camera. In their operative position, the filters are retained in their relative position by the ribs 26 between the slots 27. As should be apparent, one or more of the filters can be selectively slid into position in front of the camera lens so as to provide the desired filtration. Separate tracks or channels are provided for each filter, and the filters are separated by the ribs 26 so that they do not rub against or contact each other, thereby protecting them.

Figure 3:
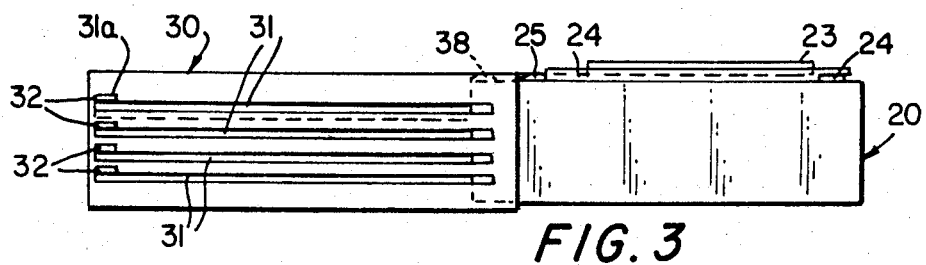
FIG. 3 is a top view of the opened device of FIG. 1.

As best seen in FIG. 3, the channels 31 have off-set portions 31a at the ends thereof for receiving tabs 32 for locking the filters in the storage position. To release a filter, the operating tab 32 of the filter is flexed out of the locking portion 31a and into the main portion of channel 31, to permit the filter to be slid with the operating tab in channel 31. The tab 32 on the filter, which enables such movement, will be discussed hereinbelow with reference to FIGS. 8-13.

Figure 7A:
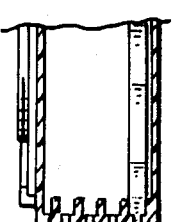
FIG. 7a is an exploded partial sectional view along the lines 7A—7A in FIG. 7.
Figure 7:
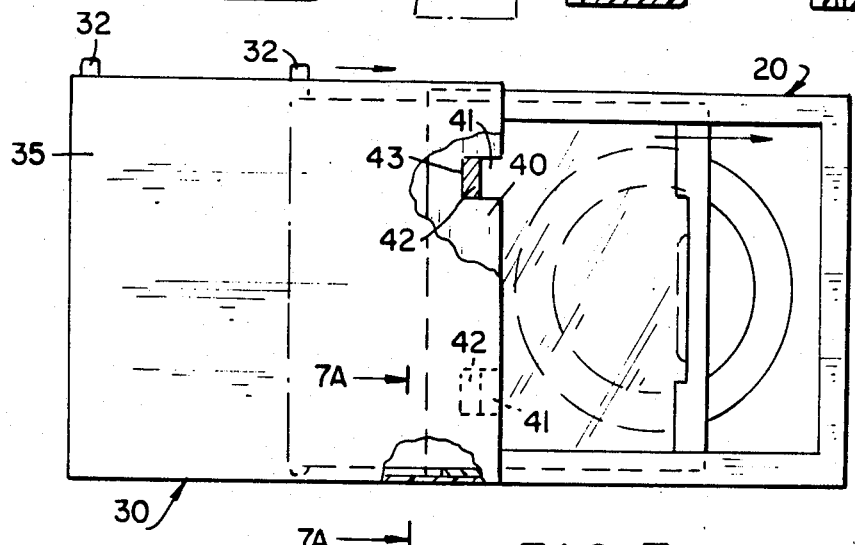
FIG. 7 is a front view of the device shown in its opened state as in FIG. 1, but with one filter partially in its operative position in front of the lens of a camera.

The device has a further lock to prevent the outer member 30 from being inadvertently pulled off of inner member 20 during use. The lock is best shown in FIG. 7 and comprises a vertically oriented wall portion 40 of the inner member 20 having inwardly directed cut-outs or reentrant areas 41. The front surface 35 of the outer member 30 has inwardly directed protrusions 42 (see in FIGS. 4 and 7). When the outer member 30 is at its outward-most position relative to inner member 20. This prevents the device from inadvertently coming apart in use. If it is desired to take the device apart to, for example, re-load it with different or additional filters, it is only necessary for the user to depress surface 40 with his finger, or with a tool or elongated object which extends under front surface 35, to release it from abutment with protrusions 42. Upon such releasing, the members 20 and 30 come apart from each other. The protrusions 42 have a sloped leading edge 44, as seen in FIG. 4 so that they more easily "ride" over the leading edge of surface 40 when the device is re-assembled.

Figure 20:
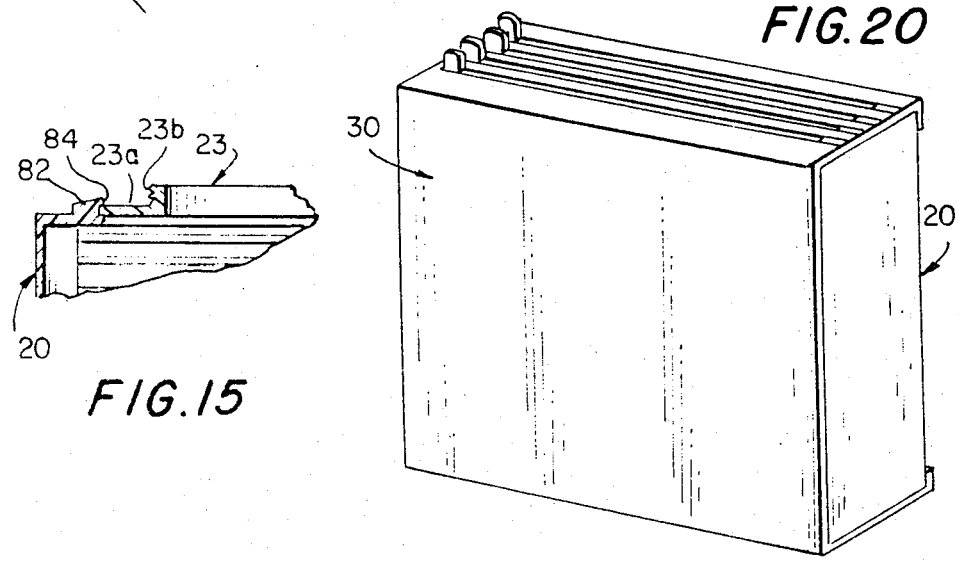
FIG. 20 illustrates the device of FIG. 1 in its closed, inoperative state.

FIG. 20 shows the device in its closed position, with the inner housing member 20 slideably nested within the outer housing member 30.

FIGS. 8-10 illustrate a typical filter 50 and filter frame 51 in accordance with the present invention. As shown in FIGS. 8-10, the filter frame 51 is generally rectangular and surrounds the filter 50 on all four sides. The frame 51 is substantially rigid, but is somewhat flexible. Frame 51 comprises projecting tabs 52,53 into which the filter 50 is snapped for retention in the frame 51. The frame 51 is dimensioned so as to be slidable within the outer member 30 and to also be slidable in the channels 27 of inner member 20. Frame 51 has a protrusion 55 at the bottom end thereof for bearing against the lower surface of outer member 30 to reduce sliding friction. The filter 50 may be easily snapped in and out of the frame 51 for replacement. Filter 50 may be any conventional filter material, but plastic filters are preferred.

The tab 32 is integral with the frame 51 and comprises a cut-out portion 54 of the frame 51 (i.e., the frame is slit or otherwise formed with an elongated opening 54'). The frame 51 is preferably made of plastic such as which has some resiliency so that tab 32 is normally arranged or biased in such a direction as to be normally located in the off-set portions 31 of the respective slots 30 to lock the filter frame 51 in the storage area of the outer member 30. When it is desired to move a filter to its operative position in member 20, the user merely flexes the tab 32 out of the respective off-set portion 31a (which is easily done by finger pressure due to the resiliency of the portion 54) so that the tab 32 is slidable in its respective slot 31.

FIGS. 11 and 12 illustrate a modified filter frame 61 which is a three-sided structure preferably made of substantially rigid, but somewhat flexible plastic material. Frame 61 has channels 62 formed in the three sides thereof, which channels are inwardly directed to receive a filter 50 therein. The filter 50 may be permanently mounted in the channels 62, for example by means of an adhesive, or may be slidably and removably mounted therein so that the filters 50 can be easily replaced or exchanged in frame 61. Cut-out portion 54 and tab 32 are identical with those provided in FIGS. 8-10. A protrusion, such as protrusion 55, may be provided to extend from the lower surface of frame 61, as illustrated in FIGS. 8 and 9.

Figure 13:
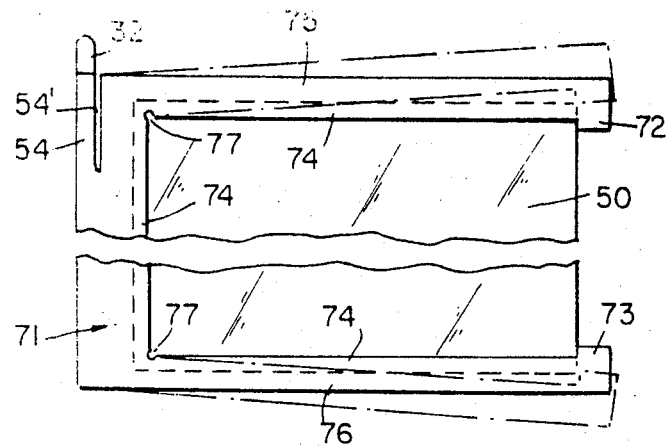
FIG. 13 is a partial front view of another embodiment of a filter frame according to the present invention, the dashed lines in FIG. 13 showing the frame sprung apart for replacement of a filter.

FIG. 13 illustrates a further modified filter frame 71 which is similar to that of FIGS. 11 and 12, but which further comprises tab portions 72,73 at the free ends of the upper and lower portions thereof to more securely lock a filter 50 in the frame 71. The filter 50 is received in slots 74 of frame 71 (in a manner similar to that shown in FIGS. 11 and 12). To remove the filter, the upper and lower legs of the frame 71 are flexed outwardly, as shown by the chain lines in FIG. 13, to release the retaining tab portions 72,73 from the filter 50. The filter 50 can then be slid out of the frame 71 for replacement. A protrusion 55 may be provided on the lower surface of frame 71, for example as shown in FIGS. 8 and 9. The filter frame of FIG. 13 has the advantage of the filter 50 being easily removable by flexing of the resilient material of the frame 71, but the filter 50 being firmly and securely locked in place when the retaining tabs 72,73 lock behind the trailing edge of the filter 50. When the filter frame 71 is mounted in a combination filter pack and holder of the present invention, the upper and lower legs 75,76 of frame 71 are retained in position by the upper and lower surfaces of the filter pack and filter holder, thus positively keeping the retaining tabs 72,73 in position to lock the filter 50 to the frame 71. Relief portions 77 may be provided at the corners of the filter frame 71 to facilitate flexing of the legs 75,76 outwardly to reduce the possibility of breakage due to such flexing.

Figure 14:
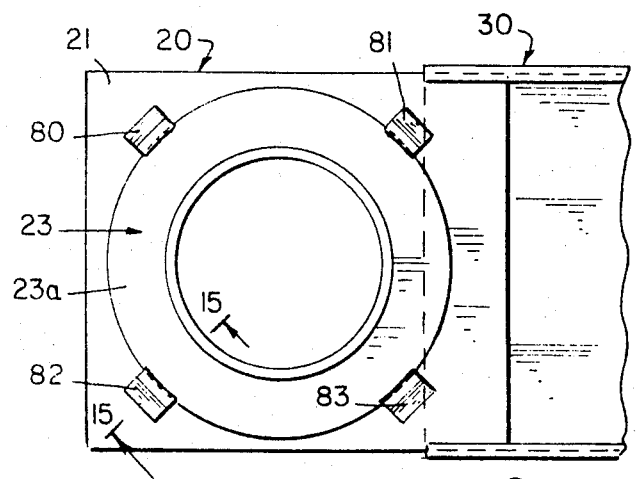
FIG. 14 is a rear view of an embodiment of the invention showing a modified retainer for the adapter.
Figure 15:
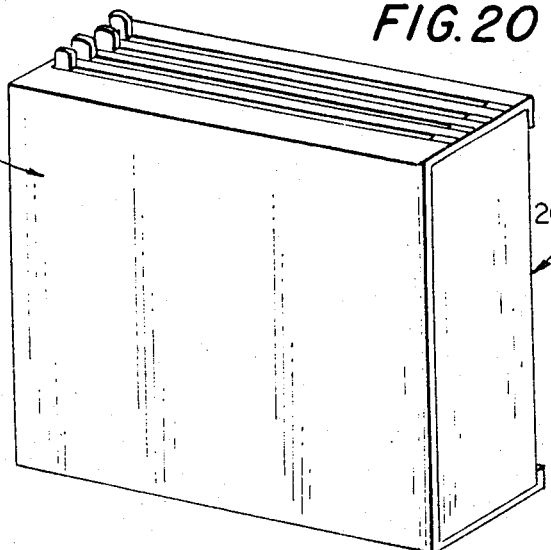
FIG. 15 is an exploded sectional view taken along the line 15—15 in FIG. 14.
Figure 19:
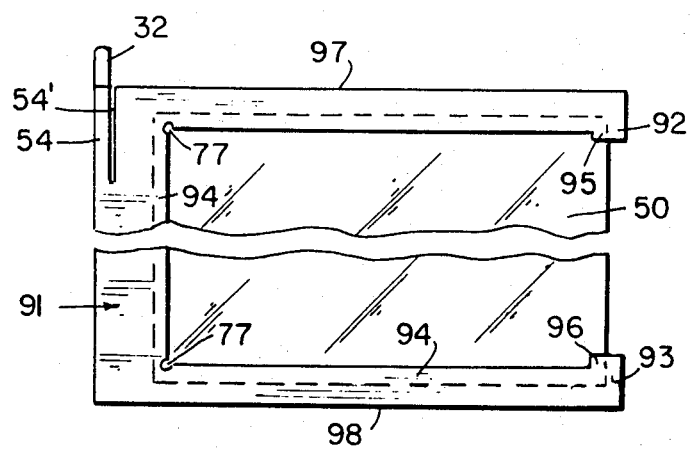
FIG. 19 is a partial front view of another embodiment of a filter frame, similar to that of FIG. 13.

FIG. 19 illustrates a further modified filter frame 91 which is similar to that of FIG. 13, but which further comprises a filter receiving slot 95,96, respectively, in the tab portions 92,93. The slots 94,95 and 96 are similar to slots 62 illustrated in FIGS. 11 and 12. Otherwise, the filter frame of FIG. 19 is similar to that of FIG. 13, like reference numerals being used to designate similar or identical constructional features. The operation of the filter frame of FIG. 19 is as discussed with respect to FIG. 13; that is, the upper and lower legs 97,98 are flexed outwardly as shown by the chain lines in FIG. 13 to release the filter 50 for sliding outwardly of the frame for replacement, etc. The material of filter frame 91 is preferably plastic which is substantially rigid, but sufficiently flexible to permit opening thereof as shown in FIG. 13. A protrusion 55 may be provided on the lower surface of Frame 91, for example as shown in FIGS. 8 and 9. FIGS. 14 and 15 illustrate a modified form of the invention wherein an adapter 23 is mounted to the inner housing member 20 by means of snap tab projections 80-83 which are preferably integrally formed with the rear surface 21 of inner housing member 20. As shown in detail in FIG. 15, the flange 23a of the adapter 23 snaps over the sloping free edge 84 of snap tab 82. Tabs 80,81 and 83 have similarly located free edges over which the flange 23a is snapable and lockable. The snap tabs 80-83 and adapter 23 are made preferably of plastic material so that the overall structure has sufficient resiliency that the adapter 23 can be snapped over the tabs 80-83 and yet be securely retained in position. Preferably, the frictional fit between the tabs 80-83 and the adapter 23 is such that the adapter 23 can be rotated relative to the inner housing member 20, if desired.

Figure 17:
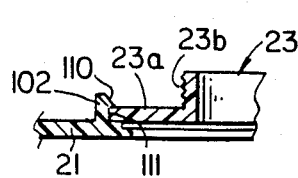
FIG. 17 is an exploded partial sectional view along the line 17—17 in FIG. 16.
Figure 18:
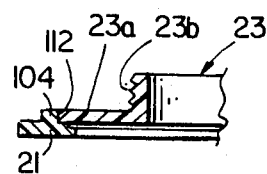
FIG. 18 is an exploded partial sectional view along the line 18—18 in FIG. 16.

FIGS. 16, 17, and 18 illustrate a further modified arrangement of the invention, similar to the embodiment of FIGS. 14 and 15, but wherein the snap tabs 80-83 are replaced by respective groups of resilient fingers 100,101,102 and 103, the groups of resilient fingers having shoulders 104-107 therebetween. The respective fingers of groups of fingers 100-103 are integrally formed with the rear surface 21 of the inner housing member 20 and are of material which is resilient enough so that the flange 23a of the adapter 23 can snap thereover.

As seen in FIG. 17, the fingers, representatively shown by a finger 102 in FIG. 17, stand upwardly from the surface 21 and have a sloping surface 110 to facilitate snapping the flange 23a over the fingers and into the receiving slot 111 defined by the fingers. The receiving slot has a relatively loose frictional fit with the flange 23a so that the flange 23a is rotatable relative to the inner housing member 20, but is sufficiently tight that once a specific rotation is set by the user, the device maintains that specific rotational orientation. The overhang defined by the sloping surface 110 maintains the flange 23a locked in place relative to the inner housing member 20.

As shown in FIG. 18, the shoulders 104-107 are provided to increase the lateral support for the flange 23a of the adapter 23. The shoulders preferably have upstanding straight walls 112 which either slightly bear against the mating edges of flange 23a or which are spaced slightly therefrom, in order to provide sufficient possibility for rotation of the adapter, while also maintaining the adapter in a given rotational orientation after being set by the user.

By providing separate fingers 100-103, in groups, applicant has found that relatively easy insertion of the adapter 23 is achieved, while also providing a structure having a high degree of structural integrity so that premature breakage will not occur. The individual fingers provide additional resiliency to the snap-on retention mechanism, but since they are provided in groups, spaced around the periphery of the adapter 23, a high degree of retention is achieved. The shoulders 104-107 absorb lateral pressures applied against the housing member 20 relative to the adapter 23, so that the lateral pressures will not tend to deform the snap-lock fingers 100-103. This further enhances the useful life of the device.

The locking arrangements for the adapter 23 as shown in FIGS. 14-18 are also suitable for use in the device shown and described in my copending application Ser. No. 86,055, now U.S. Pat. No. 4,302,078. The snap tab arrangements of FIGS. 14-18 may replace the adapter receiving slots shown therein, in the same manner as the snap-tab arrangements replace the adapter receiving slots 24 shown in FIG. 2 of the present application. In particular, the arrangement as illustrated in FIGS. 16-18 is advantageous for its ease of operation, high structural integrity and long expected life.

While the invention has been described above with respect to specific arrangements, it should be clear that various modifications and alterations may be made within the scope of the invention as defined by the appended claims.

I claim:

1. A combination photographic filter pack and filter holder for attachment to the front of a camera lens, comprising:
   first and second housing members, said first housing member being connected to said second housing member;
   said first housing member defining a storage area and including means for storing and retaining a plurality of photographic filters in said storage area;
   said second housing member comprising means for removable attachment to the front of a camera lens, and means for slidably receiving filters from said storage area of said first housing member and for retaining received filters in an operative position in registration with a camera lens to which said second housing member is attached; and
   said first housing member including means for selectively and slidably feeding any or all of said filters from said storage area within said first housing member to said operative position within said second housing member.

2. The filter pack and filter holder of claim 1 wherein said first and second housing members are slidable relative to each other, one of said housing members being slidable within the other of said housing members from a nested position wherein said one housing member is nested within said other housing member to an operative position wherein said first and second housing members are located adjacent each other.

3. The filter pack and filter holder of claim 1 or 2 wherein said second housing member is slidable within said first housing member.

4. The filter pack and filter holder of claim 1 or 2 wherein said removable attachment means comprises an adapter rotatably mounted to said second housing member.

5. The filter pack and filter holder of claim 4 wherein said adapter comprises a flange and a threaded portion extending from said flange for threadably engaging a camera lens, and wherein said second housing member comprises means for engaging said flange for firm attachment of said adapter to said second housing member, while permitting rotation of said adapter relative to said second housing member.

6. The filter pack and filter holder of claim 5 wherein said engaging means comprises slot-like means for receiving and engaging said flange.

7. The filter pack and filter holder of claim 5 wherein said engaging means comprises a plurality of upstanding resilient members extending from said second housing member, said upstanding resilient members having projecting portions over which said flange is forceably slideable by resilient bending of said upstanding members, said projections engaging at least a portion of said flange for retaining said flange engaged with said second housing member.

8. The filter pack and filter holder of claim 7 wherein said plurality of upstanding resilient members comprise a plurality of groups of individual upstanding members, the upstanding members of each group being spaced from each other, and said groups being spaced from each other about the periphery of said flange.

9. The filter pack and filter holder of claim 8 further comprising a plurality of supporting shoulders extending from said second housing member, each shoulder being interposed between two groups of said resilient upstanding members for supporting said flange after engagement of said adapter with said second housing member.

10. The filter pack and filter holder of claim 1 or 2 further comprising interengageable locking means on at least one of said first and second housing members for preventing disconnection of said first and second housing members from each other.

11. The filter pack and filter holder of claim 1 or 2 further comprising interengaging means on at least one of said first and second housing members for locking said first and second housing members in a position with said first housing member adjacent said second housing member.

12. The filter pack and filter holder of claim 1 or 2, wherein said first and second housing members are engaged with each other with said first and second housing members adjacent each other, and wherein at least said second housing member comprises track means defining a plurality of spaced apart tracks for selectively receiving one or more filters from said storage area, said one or more filters being slideable from said storage area into engagement with said track means and into said second housing member for retaining said received filters in said operative position in registration with a camera lens.

13. The filter pack and filter holder of claim 1 or 2 wherein said second housing member comprises a plurality of elongated through slots therein, and wherein said filters each comprise a projection which projects through a respective through slot so as to extend external of said first housing member.

14. The filter pack and filter holder of claim 13 wherein said projections of said filters are slideable in said respective elongated through slots for manually sliding said filters from said storage area to said operative position in said second housing member.

15. The filter pack and filter holder of claim 14 wherein said elongated through slots each have an off-set portion at an end portion thereof, and wherein said projections are biased into said off-set portions for releasably locking said filters in said storage area.

16. The filter pack and filter holder of claim 15 wherein said projections are resilient members.

17. The filter pack and filter holder of claim 1 or 2 wherein said second housing member comprises a plurality of elongated through slots therein, and further comprising a filter frame for each of said filters which are stored in said storage area, each of said filter frames having a resilient projection extending therefrom which projects through a respective elongated through slot so as to extend external of said first housing member.

18. The filter pack and filter holder of claim 17 wherein said elongated through slots each have an off-set portion at an end portion thereof, and wherein said projections are biased into said off-set portions for releasably locking said filters in said storage area.

19. The filter pack and filter holder of claim 17 wherein said filter frame comprises means for removably receiving a respective filter, whereby the respective filters can be interchanged at will.

20. The filter pack and filter holder of claim 19 wherein said filter frame comprises a pair of elongated leg members having respective slots therein for receiving a filter in said slots, said leg members being resiliently movable away from said filter to permit disengagement of said filter from said slots.

21. The filter pack and filter holder of claim 20 wherein each of said resilient legs comprises a stop member at respective ends thereof for preventing inadvertent disengagement of said filter from said filter frame.

22. A filter frame comprising a frame member at least partially surrounding a photographic filter, said frame member being at least partially fabricated of resilient material and having at least two opposed elongated engagement portions adapted to engage opposed edges of a filter; and means on said resilient material portion of said frame member for releasably engaging a filter with said engagement portions; said engagement portions comprising at least two oppositely disposed elongated leg members having respective channels therein for receiving a filter, said leg members being resiliently movable relative to each other to increase the spacing therebetween in order to disengage said filter from at least a portion of said channels to thereby permit removal of said filter from said channels and from said frame member.

23. The filter frame of claim 22 further comprising a resilient handling and locking projection extending from said frame member.

24. The filter frame of claim 23 further comprising a bearing projection extending from a surface of said filter frame opposite said resilient projection.

25. The filter frame of claim 23 or 24 wherein said reslient projection comprises a portion of a frame member partially separated from the main part of said frame member by a cut-out, and a projecting member extending from said partially separated portion of said frame, said resilient projection being integral with and resiliently connected with said main part of said frame.

26. The filter frame of claim 22 wherein said elongated leg members comprise stop members at free ends thereof for preventing disengagement of said filter from said channels when said leg members are not spread apart.

27. The filter frame of claim 26 wherein said stop members have channel portions therein which are in alignment with said channels of said elongated legs for receiving at least a portion of said filter therein.

28. A holder for photographic filters, comprising:
a first member having an opening therein:
means coupled to said first member and defining at least one channel on one side of said first member for removably receiving at least one filter therein; and
means on the opposite side of said first member for removably attaching said first member to the front of a camera lens, said attachment means including:
an adapter having a flange and a threaded portion extending from said flange for threadably engaging a camera lens; and
a plurality of groups of individual, spaced apart upstanding resilient members, said groups being spaced apart about the periphery of said flange, each upstanding member having projecting portions over which said flange is forceably slideable by resilient bending of said upstanding members, said projections engaging at least a portion of said flange for retaining said flange engaged with said first member while permitting rotation of said adapter relative to said first member.

29. The holder of claim 28 further comprising a plurality of supporting shoulders extending from said first member, each shoulder being respectively interposed between two adjacent groups of said resilient upstanding members for supporting said flange after engagement of said adapter with said second first member.

30. The holder of claim 24 wherein said shoulders define bearing surfaces for said flange.

* * * * *

UNITED STATES PATENT AND TRADEMARK OFFICE
CERTIFICATE OF CORRECTION

PATENT NO. : 4,383,735

DATED : May 17, 1983

INVENTOR(S) : David M. Stravitz

It is certified that error appears in the above-identified patent and that said Letters Patent is hereby corrected as shown below:

COLUMN 10 (Claim 30), line 1, change "claim 24" to --claim 29--.

Signed and Sealed this

Nineteenth Day of July 1983

[SEAL]

Attest:

GERALD J. MOSSINGHOFF

Attesting Officer    Commissioner of Patents and Trademarks